(12) United States Patent
Kobayashi et al.

(10) Patent No.: US 7,993,569 B2
(45) Date of Patent: Aug. 9, 2011

(54) METHOD OF MANUFACTURING HEAT-RESISTANT MOULD ARTICLES MADE OF POLYETHYLENE TEREPHTHALATE POLYESTERS

(75) Inventors: Yukio Kobayashi, Tokyo (JP); Takashi Fujimaki, Kanagawa (JP); Takashi Nakamoto, Osaka (JP)

(73) Assignees: FTEX, Incorporated, Kanagawa (JP); Nakamoto Packs Co., Ltd., Osaka (JP)

( * ) Notice: Subject to any disclaimer, the term of this patent is extended or adjusted under 35 U.S.C. 154(b) by 1081 days.

(21) Appl. No.: 10/927,118

(22) Filed: Aug. 27, 2004

(65) Prior Publication Data

US 2006/0043646 A1 Mar. 2, 2006

(51) Int. Cl.
*B29C 51/02* (2006.01)
*B29C 51/42* (2006.01)

(52) U.S. Cl. ............... 264/553; 264/102; 264/210.5; 264/211.24; 264/554

(58) Field of Classification Search ............ 264/102, 264/210.5, 211.24, 476, 492, 553, 571, 544, 264/550, 554; 525/438
See application file for complete search history.

(56) References Cited

U.S. PATENT DOCUMENTS

| | | | | | |
|---|---|---|---|---|---|
| 3,429,854 | A | * | 2/1969 | Rein et al. | 264/547 |
| 3,496,143 | A | * | 2/1970 | Rein et al. | 264/544 |
| 4,110,395 | A | * | 8/1978 | Akutin et al. | 264/210.5 |
| 4,878,826 | A | * | 11/1989 | Wendt | 425/384 |
| 4,943,406 | A | * | 7/1990 | Bocchi | 264/522 |
| 5,614,145 | A | * | 3/1997 | O'Kane | 264/458 |
| 6,506,852 | B2 | * | 1/2003 | Yoshimura et al. | 525/438 |
| 2002/0035218 | A1 | * | 3/2002 | Yoshimura et al. | 525/438 |
| 2003/0047565 | A1 | * | 3/2003 | Oda et al. | 220/660 |

FOREIGN PATENT DOCUMENTS

| | | | | |
|---|---|---|---|---|
| EP | 1293527 | A1 | * | 3/2003 |
| JP | 2003251673 | A | * | 9/2003 |
| JP | 2004155176 | A | * | 6/2004 |
| JP | 2004161967 | A | * | 6/2004 |

* cited by examiner

*Primary Examiner* — Robert B Davis
(74) *Attorney, Agent, or Firm* — Sughrue Mion, PLLC

(57) ABSTRACT

The present invention provides a method of manufacturing high-melting-tension heat-resistant transparent or opaque sheets, boards, and molds from polyethylene terephthalate (PET). The method is characterized in that a mixture of:

(1) PET polyester whose melt flow rate (MFR) is 45-130 g/10 minutes (a);
(2) coupling agent master batch (f) comprising coupling agent (d) and substrate (e), wherein coupling agent (d) is a mixture of compounds containing 2 epoxy groups (b) and compounds containing 3 or more epoxy groups (c); and
(3) catalyst master batch (i) comprising coupling reaction catalyst (g) and substrate (h);

is melted in a reaction-extruder to give PET polyester whose MFR is 40 g/10 minutes or less. The resulting PET polyester is molded into amorphous sheets or boards, and then heated again to a predetermined temperature to give transparent heat-resistant sheets or boards; or then vacuum-, pressure-, or vacuum-pressure-formed following heat-setting to give transparent heat-resistant or white opaque highly-heat-resistant mould articles.

6 Claims, 2 Drawing Sheets

Commercial PET
HO           OH   Linear Structure

Recovered PET                          New PET
                             Catalyst

Recovered PET

Coupling Agent     Long Chain Branched Structure

METHOD OF MANUFACTURING HEAT-RESISTANT MOULD ARTICLES MADE OF POLYETHYLENE TEREPHTHALATE POLYESTERS

TECHNICAL FIELD

The present invention relates to a method of manufacturing inexpensive heat-resistant transparent or white opaque mould articles, made of polyethylene terephthalate (PET) polyesters, suitable for transparent heat-resistant sheets and boards, transparent containers stable even against heating and filling, transparent containers stable even against being heated in a microwave oven, and opaque containers stable even against being heated in an oven range.

BACKGROUND ART

In recent years, transparent sheets and boards resistant against around 80° C., and moulds thereof, such as blister packs, automatic vendor windows, containers for foods and beverages (resistant against around 80-90° C.), containers for heating in microwave ovens (resistant against around 110-14° C.), lunch boxes, and containers for heating in oven ranges (resistant against around 180-220° C.), are being needed more and more as quality of life (QOL) more highly develops. Conventionally, as candidates of resins of these containers, polypropylene (PP), polystyrene (PS), polyethylene terephthalate (PET, non-stretched A-PET or white crystallised C-PET), polybutylene terephthalate (PBT), and polycarbonate (PC) have been proposed and some of them have been used. These resins have both advantages and disadvantages with respect to quality, including heat-resistance, processability, transparency, and strength etc.; costs; environmental adaptability; and safety etc.

For instance, polypropylene (PP) is inexpensive and easy to be processed. However, PP is not so good at transparency and shows elusion of a stabiliser etc. contained in PP at around 70° C. or higher. Polystyrene (PS) is inexpensive and shows good processability and transparency. However, PS has a safety problem with respect to residual monomers, and other problems with respect to weakness of resulting containers and deformation of resulting lunch boxes at around 110° C. or higher, which is the heat-resistance temperature for microwave ovens.

In general, sheets and containers thereof made of non-stretched amorphous PET (A-PET) have excellent transparency, strength, and environmental adaptability. However, their glass transition temperature (Tg) is low around 65-75° C., and they gradually deform at 80° C. or higher. Moreover, at around 110° C. or higher, which is the heat-resistant temperature for microwave ovens, A-PET has disadvantages of whitening by crystallisation, embrittlement, and deformation. Transparent films of biaxially oriented PET have heat-resistance against around 180°° C. However, they have high crystallisation degree (around 40%) due to molecular orientation by stretch direction. They are difficult to be pressure-formed into mould articles. Biaxially oriented sheets and boards are difficult to be obtained and are expensive.

A crystallised white PET (Crystalline-PET, C-PET) is excellent in heat-resistance against oven ranges, and environmental adaptability. However, resulting final mould products are difficult to be manufactured and expensive because a polyethylene medium with inorganic crystallisation seeds such as mica must be blended with PET and the resulting mixture is formed into white C-PET sheets (see e.g. Japanese Patent Publication No. 64-9179) and then moulded by two stage of vacuum-pressure-forming in a double-mould process for a long processing time (see e.g. Japanese Patent Publication No. 6-26854).

Furthermore, 140° C.-resistant sheets and containers have been successfully manufactured using a composition composed of 70-100 parts by weight of PBT resins and 30-0 parts by weight of PET resins (see e.g. Japanese Patent No. 2553228). However, use of PBT more than PET makes final mould products more expensive and brings a disadvantage that homogeneous moulds are difficult to be obtained due to the composition which whitens a part of the moulds.

Still furthermore, polycarbonate (PC) is excellent in transparency, strength, and heat-resistance but is expensive. Hence final products such as sheets etc. also become expensive and thus cannot be responsible to their demands. Still furthermore yet, Bisphenol-A, the main starting material of PC, has a problem in environmental adaptability, such as environmental hormones, and thus cannot be responsible to the demands.

In recent years, necessity for recycling plastic products used and recovered from production processes in plants or from general consumers has been globally recognized from a viewpoint of saving resources and preserving environment. In particular, recovery and recycle of large amounts of used PET bottles, films, sheets, and the like are actively being progressed. It has become possible to obtain them at prices only half of those of commodity resins. However, molecular weights of used and recovered PET have already decreased, compared to those of new virgin PET. For example, molecular weights of flakes of large amounts of recovered PET bottles have been already almost half reduced. Therefore, reuse of recovered PET only as a base resin results in poor mouldability. Resulting moulded products are weak and poor at impact-strength, hence quality as good as that of virgin PET bottles cannot be ensured. As a result, there are provided only fibres which can be moulded despite their low molecular weights, sheets of poor quality, and the like. Thus, their applications are limited within a narrow field. Furthermore, transparent PET polyesters have a Tg around 70° C. Hence they are glassy at room temperature (RT) and thus poor at cold brittleness, that is cold-resistance, and impact-strength. Since they do not have heat-resistance against 80° C. or higher, they are difficult to be developed in new applications.

On the other hand, polyolefins such as polyethylene, polypropylene etc. are used for films, sheets, containers, and so on in large quantities. However, it is known that such polyolefins are far inferior, in transparency, stiffness and hardness, to rigid vinyl chloride, PET polyesters, and polystyrene.

One method for solving these problems is a method for recovering and increasing molecular weights. With respect to PET polyesters, there are known methods for recovering molecular weights by solid phase polymerisation, for increasing molecular weights by reaction of chain-extender (coupling agent) with polyester terminal groups, and for adding other resins such as elastomers to enhance mechanical properties.

As the chain-extenders, coupling agents, there is proposed use of compounds having coupling hands or functional groups such as isocyanate, oxazoline, epoxide, aziridine, carbodiimide etc. However, there are many restrictions in terms of reactivity, heat-resistance, and stability etc., hence there are few useful chain-extenders. Amongst them, epoxy compounds are relatively useful. For example, monoepoxy compounds (Japanese Patent Laid-open No. 57-161124 A) and diepoxy compounds (Japanese Patent Laid-open No. 07-166419 A, Japanese Patent Publication No. 48-25074 B, Japanese Patent Publication 60-35944 B, etc.). However, they have many problems with respect to reaction speed, gel generation, melt viscosity, solubility, heat-stability, physical properties of resulting moulded products, and so on, and thus are difficult to be put to practical use.

On the other hand, there is proposed a method of increasing molecular weights of recovered PET polyesters by melting and mixing with a bifunctional epoxy resins and sterically hindered hydroxyphenylalkyl phosphonates (esters) (Japanese Patent Laid-open No. 08-508776 A (PCT)). In this method, the reaction rate is relatively rapid. However, the sterically hindered hydroxyphenylalkyl phosphonates (esters) are expensive and toxic, hence there are still remaining problems in practical use in industries where low costs for recovery and recycle are required and in food packaging where safety is required.

Furthermore, a method previously proposed by the inventors of the present invention (U.S. Pat. No. 6,506,852 B2), in which moderate molecular weight PET polyesters such as recovered PET bottles and virgin PET after condensation reaction were melted, mixed and reacted with both bifunctional epoxy compounds and polyfunctional epoxy compounds under specific catalysts, increased the molecular weights and the melting tension to allow to mould films and sheets but not to allow to obtain sufficient acknowledgements of heat-resistance. The inventors have further enabled also to mould foaming sheets (PCT WO 00/20491). However, moulded products from the foaming sheets are slightly weak and improvement of impact-strength and cold-brittleness, cold-resistance, are required. For instance, as packaging materials for frozen foods, moulded products not broken even at a low temperature of −20 to −30° C., while heat-resistant against 130° C. preferably, 230° C. more preferably, are needed.

Transparent sheets, boards, and containers of heat-resistant against around 80-130° C. have an advantage that their insides can be seen, and thus have big markets of, for example, blister packs, automatic vendor windows, containers for heated foods and for heating in microwave ovens, lunch boxes etc. Transparent blister packs as containers for small domestic electric products and OA instruments must have heat-resistance against 80° C., which is the maximum temperature at ship bottoms upon export or import. Transparent windows of automatic vendors must have heat-resistance against 80-90° C. derived from their display lights, hot cans to be sold etc.

On the other hand, containers highly heat-resistant against 180-230° C. are mainly used for oven ranges but require heat-resistance against temperatures around 100° C. higher than those of usual, not highly, transparent heat-resistant containers. Due to these much higher temperatures, usual moulding conditions give no transparency and give white opaque containers because of diffuse reflection, which is because sizes of spherical crystals of the resins are greater than wave lengths of visual lights. The difference between transparent and white opaque is dependent upon sizes of spherical crystals. However, it is important that crystallisation does not further proceed when these containers are heat-treated and utilised, and they thus are not whitened to be opaque and brittle.

In order to realise the above inexpensive and heat-resistant moulds, recovered PET bottles and recovered PET sheets available at prices half of those of commodity resins may be used as base materials resulting in, however, moulds of low molecular weights and of poor quality. Accordingly, larger molecular weights, higher melt viscosity, and high speeds of crystallisation are required. However, molecular weights of conventional PET become larger by condensation following solid phase polymerisation, but "linear structures" only are generated. Thus, higher melt viscosity and high speeds of crystallisation cannot be achieved. Accordingly, neck-in is large in moulding sheets, and drawn-down also is large at high temperatures in pressure-moulding or vacuum-pressure-moulding of sheets. Furthermore, efficient production cannot be achieved due to slow crystallisation rates of several minutes resulting in elongation of moulding process cycle and in difficulty to realise inexpensive heat-resistant moulds. On the other hand, A-PET without heat-setting generally has crystallisation temperatures (Tc according to slowly, i.e. 10° C./minute, increasing temperature of DSC method) of around 120-130° C., resulting in 5-6% of small crystallisation degree not to give heat-resistance.

An object of the present invention is to invent sheets and boards capable of being crystallised rapidly, and to provide a manufacturing method of inexpensive transparent or white opaque heat-resistant mould articles made of PET polyesters suitable for transparent blister packs heat-resistant against 80° C. or higher, transparent windows of automatic vendors, transparent containers stable even against heating and filling, transparent containers heat-resistant against 110-140° C. by microwave ovens, and white opaque containers heat-resistant against 180-220° C. by oven ranges, by control of transparency and opacity by management of sizes of the spherical crystals.

DISCLOSURE OF THE INVENTION

The inventors of the present invention have made extensive studies over and over in order to solve the above problems. As a result, the inventors have finally succeeded to dramatically solve the above problems and completed the present invention, where an inexpensive recovery PET or a condensed virgin PET for fibres was used as a base resin. As coupling agents, compounds containing two epoxy groups (b) are used together with compounds containing three or more epoxy groups (c) to form PET with "branched long chain structures". By increasing (c)/(b) ratio, drawn-down of sheets and boards are reduced. Further presence of metal catalysts realised increasing crystallisation rate and controlling spherical crystal sizes upon moulding. This is because the compounds containing three or more epoxy groups (c) form polyhydroxy ether esters following formation of ionic bonds with alkali metals and alkali earth metals of catalyst (g). These formations may act as "crystallisation seeds of molecular size". The "long chain branched structures" of the present invention can give melt viscosity around 10-100 folds higher than conventional "linear structures" of PET polymerised on solid phase, due to "entanglement effects" of "long chain branched structures". Hence there are provided sheets having little draw-down in vacuum-, pressure-, or vacuum-pressure-forming. Furthermore, application of a reactive processing method using master batches including coupling agents and catalysts to polymerisation of the present invention made the polymerisation proceed rapidly and gave sheets and boards of much fewer gels and fish-eyes.

Another feature of the present invention is that, regarding "long chain branched structure" sheets and boards as manufactured above, crystallisation rate is around 5-10 folds greater than that of usual PET due to the "crystallisation seeds of molecular size" upon re-heating (or heat-setting). Accordingly, without any conventional biaxially oriented crystallisation method, "non-oriented crystallisation method" simply by re-heating (or heat setting) could give crystallisation and improvement of heat-resistance.

Another feature of the present invention is that temperature control upon manufacturing moulds from "long chain branched structure" sheets and boards as described above can give control also of transparency or white opacity of the moulds. Since "long chain branched structures" of the present invention have a rapid crystallisation speed, spherical crystal sizes are controlled to be equal to or less than wave lengths of visual lights when surface temperatures of sheets and boards are 120-150° C. If they are further moulded and heat-set at transparent state, transparent heat-resistant moulds are obtained. On the other hand, crystalline growth is promoted when surface temperatures of sheets and boards upon moulding are rapidly increased to 155-250° C. If they are further moulded and heat-set at white opaque state, white opaque highly-heat-resistant moulds are obtained.

Classification of sheets and boards of the present invention are dependent upon their thickness, i.e. 1 mm or thinner, and 1 mm or thicker, respectively.

The present invention provides the invention matters described below.

1. A method of manufacturing transparent heat-resistant sheets or boards made of PET polyesters, wherein a mixture comprising:
    (1) 100 parts by weight of PET polyester (a) whose melt flow rate (MFR, JIS method: 280° C., 2.16 Kg in load) is 45-130 g/10 minutes;
    (2) 1-10 part(s) by weight of coupling agent master batch (f) comprising:
        5.0-50 parts by weight of coupling agent (d) which is a mixture of:
            25-95% by weight of compounds (b) containing two epoxy groups; and
            75-5% by weight of compounds (c) containing three or more epoxy groups; and
        100 parts by weight of substrate (e); and
    (3) 0.05-2 parts by weight of coupling reaction catalyst (g) which is metal salts of carboxylic acids
is melted at a temperature over the melting point, and then reacted homogeneously with degassing and dehydrating in vacuo ($13.3 \times 10^3$ Pa or less) in an extruder to obtain PET polyester whose MFR is 40 g/10 minutes or less, and the resulting PET polyester is moulded into amorphous sheets or boards, which then are heated again to be transparent at 120-200° C. of their surface temperature.

2. A method of manufacturing transparent heat-resistant mould articles made of PET polyesters, wherein a mixture comprising:
    (1) 100 parts by weight of PET polyester (a) whose MFR (JIS method: 280° C., 2.16 Kg in load) is 45-130 g/10 minutes;
    (2) 1-10 part(s) by weight of coupling agent master batch (f) comprising:
        5.0-50 parts by weight of coupling agent (d) which is a mixture of:
            25-95% by weight of compounds (b) containing two epoxy groups; and
            75-5% by weight of compounds (c) containing three or more epoxy groups; and
        100 parts by weight of substrate (e); and
    (3) 0.05-2 parts by weight of coupling reaction catalyst (g) which is metal salts of carboxylic acids
is melted at a temperature over the melting point, and then reacted homogeneously with degassing and dehydrating in vacuo ($13.3 \times 10^3$ Pa or less) in an extruder to obtain PET polyester whose MFR is 40 g/10 minutes or less, and the resulting PET polyester is moulded into transparent amorphous sheets or boards, which are heated again to be transparent at 120-150° C. of their surface temperature, and then are vacuum-, pressure-, or vacuum-pressure-formed following heat-setting.

3. A method of manufacturing opaque heat-resistant mould articles made of PET polyesters, wherein a mixture comprising:
    (1) 100 parts by weight of PET polyester (a) whose MFR (JIS method: 280° C., 2.16 Kg in load) is 45-130 g/10 minutes;
    (2) 1-10 part(s) by weight of coupling agent master batch (f) comprising:
        5.0-50 parts by weight of coupling agent (d) which is a mixture of:
            25-95% by weight of compounds (b) containing two epoxy groups; and
            75-5% by weight of compounds (c) containing three or more epoxy groups; and
        100 parts by weight of substrate (e); and
    (3) 0.05-2 parts by weight of coupling reaction catalyst (g) which is metal salts of carboxylic acids
is melted at a temperature over the melting point and then reacted homogeneously with degassing and dehydrating in vacuo ($13.3 \times 10^3$ Pa or less) in an extruder to obtain PET polyester whose MFR is 40 g/10 minutes or less, and the resulting PET polyester is moulded into transparent amorphous sheets or boards, which are heated again to be white opaque at 155-250° C. of their surface temperature, and then are vacuum-, pressure-, or vacuum-pressure-formed following heat-setting.

4. The method further characterised in that the sheets or the boards are heated to be transparent by 120-200° C. hot-air or a far-infrared (1R) heater.

5. The method further characterised in that PET polyester (a) contains at least one or more selected from the group consisting of PET with intrinsic viscosity (IV) of 0.60-0.80 dl/g, PET aromatic polyesters, and PET aromatic polyester moulds recovered.

6. The method further characterised in that compounds (b) contain at least one or more selected from the group consisting of aliphatic ethylene glycol diglycidyl ether, polyethylene glycol diglycidyl ether, hexamethylene diglycidyl ether; cyclic aliphatic hydrogenated bisphenol A diglycidyl ether; and aromatic bisphenol A diglycidyl ether.

7. The method further characterised in that compounds (c) contain at least one or more selected from the group consisting of aliphatic trimethylolpropane triglycidyl ether, glycerin triglycidyl ether, epoxidised soybean oil, epoxidised linseed oil; heterocyclic triglycidyl isocyanurate; and aromatic phenol novolac-type epoxy resins, cresol novolac-type epoxy resins, and bis-resorcinol tetraglycidyl ether.

8. The method further characterised in that coupling reaction catalyst (g) is at least one or more selected from the group consisting of lithium salts, sodium salts, potassium salts, magnesium salts, calcium salts, zinc salts, and manganese salts of stearic acid or acetic acid.

Inexpensive heat-resistant sheets, boards, and other mould articles made of PET polyesters according to the present invention have "long chain branched structures" and thus are flexible and not brittle, and furthermore are good at mechanical strengths such as heat-resistance, tensile strength and so on. Not only transparent blister packs, transparent windows of automatic vendors, containers stable even against heating and filling, containers for microwave ovens and for oven ranges, lunch boxes, and so on, but also a variety of other applications is expected. For example, containers for foods and beverages, packaging materials, separation plates, and so on. For foods and beverages, however, according to FDA, it is necessary to laminate a skin layer of 30 micrometers or thicker of a virgin PET on surfaces of sheets, boards, containers or bottles of the present invention.

Furthermore, the present invention enables to efficiently utilise quite a large amount of recovered PET bottles as prepolymers, and thus give benefits to society. Still furthermore, even if PET sheets, boards and mould articles of the present invention are burnt after their use, they generate less calorie than polyethylene and polypropylene, and thus give furnaces less damage and give no toxic gases.

BEST MODE FOR CARRYING OUT THE INVENTION

Figure 1:
FIG. 1 shows production mechanism of New PET with low MFR and with high melt viscosity by coupling reaction, and shows backbone structures of PET polyesters of the present invention. The trifunctional coupling agents (c) and the resulting "long chain branched structures" are shown.
Figure 1:
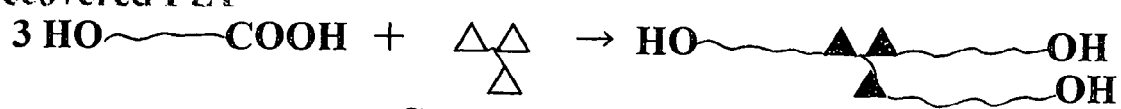

PET polyester (a) as a base resin in the present invention may be PET, which is globally mass-produced, or copolymers thereof, and preferably PET. The PET polyester (a) of the present invention preferably has an intrinsic viscosity (IV) of 0.50 dl/g or more, as measured at 25° C. after being dissolved in a mixture solvent of 1,1,2,2-tetrachloroethane/phenol (1:1), corresponding to a melt flow rate (MFR) of around 210 g/10 minutes or less at 280° C. and a load of 2.16 Kg in the JIS method, more preferably 0.60 dl/g or more, corresponding to around 130 g/10 minutes or less of MFR. When IV is less than 0.50 dl/g, it is difficult to obtain excellent mouldability and physical properties of resulting PET polyesters.

The upper limit of IV is not particularly limited, but is usually 0.90 dl/g corresponding to around 25 g/10 minutes of MFR, preferably 0.80 dl/g corresponding to around 45 g/10 minutes of MFR.

Actually in many cases, flakes or pellets of recovered PET bottles made of PET polyesters being collected and recovered in large amounts are used as a base resin. Normally, IV of fresh PET bottles is relatively high. Hence IV of recovered PET bottles also is high, generally 0.60-0.80 dl/g corresponding to 130-45 g/10 minutes of MFR, and particularly 0.65-0.75 dl/g corresponding to 100-55 g/10 minutes of MFR. In general, flakes of recovery PET bottles are supplied as a paper bag of 20 kg flakes or as a flexible container of 600 kg flakes. Typical water content is around 3,000-6,000 ppm corresponding to 0.3-0.6% by weight. It should be noted that skeleton flakes, i.e. margin flakes, of A-PET sheets collected in a large amount from vacuum-pressure-forming factories also are preferable as a starting base resin (a) of the present invention.

Additionally regarding use for foods and beverages, virgin PET by condensation method, whose IV is generally 0.60-0.65 dl/g, for fibres is preferable due to being inexpensive and supplied constantly.

The coupling agents of the present invention are a mixture of compounds containing two epoxy groups (b) and compounds containing three or more epoxy groups (c).

Examples of compounds (b) generally include aliphatic ethyleneglycol diglycidyl ether, polyethyleneglycol diglycidyl ether, polypropyleneglycol diglycidyl ether, tetramethyleneglycol diglycidyl ether, 1,6-hexamethyleneglycol diglycidyl ether, neopentylglycol diglycidyl ether, and glycerin diglycidyl ether; cyclic aliphatic hydrogenated Bisphenol A diglycidyl ether, hydrogenated isophthalic acid diglycidyl ester, 3,4-epoxycyclohexylmethyl-3,4-epoxycyclohexanecarboxylate, and bis(3,4-epoxycyclohexyl)adipate; heterocyclic diglycidyl hydantoin, and diglycidyl oxyalkyl hydantoin; aromatic Bisphenol A diglycidyl ether; initially condensed products of Bisphenol A diglycidyl ether, di(hydroxyphenyl)methane diglycidyl ether, terephthalic acid diglycidyl ester, isophthalic acid diglycidyl ester, and diglycidylaniline etc.

Examples of compounds (c) include aliphatic compounds such as trimethylolpropane triglycidyl ether and glycerin triglycidyl ether; heterocyclic compounds such as triglycidyl isocyanurate, triglycidyl cyanurate, and triglycidyl hydantoin; and aromatic compounds such as tetraglycidyl diaminophenylmethane, tetraglycidyl bisaminomethylcyclohexane, triglycidyl para- or meta-aminophenol etc.

One of features of the present invention is to select coupling agents. As coupling agents, compounds containing two epoxy groups (b) are used together with compounds containing three or more epoxy groups (c) to form "long chain branched structures", which increase molecular weights of recovered PET and increase also swelling due to "entanglement effects" of the "long chain branched structures". The "long chain branched structures" of the present invention allow to give melt viscosity around 10-100 folds higher than that of conventional "linear structures" due to "entanglement effects" from a lot of branched chains. Hence there are provided sheets and boards having little draw-down in pressure-forming or in vacuum-pressure-forming.

Furthermore, crystallization rate can be increased as (c)/(b) ratio is increased. This may be because compounds containing three or more epoxy groups (c) form polyhydroxy ether ester/alkali metal and alkali earth metal complexes, which act as "crystallisation seeds of molecular size".

Compounds (d), coupling agents of the present invention, are a mixture of 95-25% by weight of compounds containing two epoxy groups (b) and 5-75% by weight of compounds containing three or more epoxy groups (c). As the latter (c) increases, swelling and melt viscosity of resulting resins increase rapidly. The weight ratio of (c)/(b) is normally from 5/95 to 75/25, preferably from 10/90 to 70/30, and more preferably from 25/75 to 50/50. As the (c)/(b) ratio increases, crystallisation rate also increases. If the (c)/(b) ratio is 5/95 or less, there is found little effect of the present invention. If the (c)/(b) ratio is 75/25 or more, PET polyesters of the present invention can hardly be obtained and cannot be sold on markets because of gels and fish-eyes. In addition, coupling agent master batch (f) consists of 5.0-50 parts by weight of coupling agent (d) and 100 parts by weight of substrate (e). Coupling agent (d) is preferably 7.5-20 parts by weight. If coupling agent (d) is 5.0 parts by weight or less, coupling agent master batch (f) shows little effect and brings much cost. If coupling agent (d) is 50 parts by weight or more, this is not preferable because coupling agent master batch (f) is difficult to be produced but easy to give gels during the coupling reaction.

An additional feature of the present invention is to use coupling agent master batch (f) utilizing substrate (e) as a diluent for coupling agent (d) in order to prevent local reactions of coupling agent (d). These local reactions cause gels and fish-eyes. When resulting mould articles must be transparent, examples of substrate (e) include PET polyesters, whose IV is 0.50-0.90 dl/g, compatible with PET polyester (a) as a base resin, recovered PET polyester moulded products, condensates (e.g. PET G from Eastman Chemical Co., Ltd.) of ethyleneglycol, cyclohexane dimethanol, terephthalic acid, and so on, toluene, benzene, xylene, and so on. When resulting molded products do not have to be transparent, examples of substrate (e) include also polyethylene acrylate resins, from Japan Polyolefins Co. Ltd. etc., which are non-PET polyesters and are not compatible with PET polyester (a) as a base resin.

The blending ratio of coupling agent master batch (f) is generally 1-10 part(s) by weight to 100 parts by weight of PET polyester (a), preferably around 2-5 parts by weight, which allow good dispersion and mixing properties. As the ratio increases, MFR of PET polyesters decreases. Thus, melt viscosity can be increased.

An additional feature, that is coupling reaction catalyst (g), of the present invention is metal salts of carboxylic acids. If a single metal salt of a carboxylic acid is only used, there are both an advantage and a disadvantage. Therefore, preferably, complex metal salts of carboxylic acids are used.

For example, duplex catalysts are: lithium stearate/calcium stearate=20-50/100, sodium stearate/calcium stearate=20-50/100, potassium stearate/calcium stearate=20-50/100, manganese acetate/lithium stearate=20-50/100, and manganese acetate/calcium stearate=20-50/100 and so on in weight ratios. Triplex catalysts are: lithium stearate/sodium stearate/calcium stearate=50/50/100, lithium stearate/sodium acetate/calcium stearate=50/50/100, potassium stearate/sodium strearate/calcium stearate=50/50/100, lithium stearate/manganese acetate/calcium stearate=50/50/100 and so on in weight ratios.

Another feature of the present invention is to use catalyst master batch (i) utilising substrate (h) as a diluent for catalyst (g) in order to prevent local reactions around catalyst (g). The local reactions cause gels and fish-eyes in sheets and boards.

Substrate (h) can be used as a powder or a resin. When substrate (h) is a powder, for example, calcium stearate which has a lubricant effect but whose catalyst activity is weak can be used. The blending ratio of calcium stearate is equal to or more than 50 parts by weight based upon amounts of catalysts. This powder complex catalyst still has a problem regarding powder spill, but is inexpensive and suitable for small scale manufacture.

When substrate (h) is a resin, almost similar to substrate (e), examples of substrate (h) are: PET aromatic polyesters with IV of 0.50-0.90 dl/g, recycled PET aromatic polyester moulded products, condensates (e.g. PET G from Eastman Chemical Co., Ltd. etc.) of ethyleneglycol, cyclohexane dimethanol, terephthalic acid and so on, polyethylene acrylate resins (e.g. from Japan Polyolefins, Co., Ltd. etc.), polyacrylate resins including copolymers, and so on.

When resulting moulded products should be transparent, PET polyesters, polyacrylate resins including copolymers, and so on can be used. When resulting moulded products do not have to be transparent, polyethylene acrylate resins (e.g. from Japan Polyolefins, Co. Ltd. etc.) and the like can be used.

The composition of catalyst master batch (i) is generally 5-15 parts by weight of catalyst (g) and 100 parts by weight of substrate (h), preferably 7.5-12.5 parts by weight of catalyst (g) and 100 parts by weight of substrate (h), and more preferably 10 parts by weight of catalyst (g) and 100 parts by weight of substrate (h). If catalyst (g) is 5 parts by weight or less, catalyst master batch (i) exerts little effect while being expensive. Catalyst (g) is 15 parts by weight or more, catalyst master batch (i) can be hardly produced, gels are readily generated in the coupling reaction, and they cause hydrolysis of resins obtained during molding.

Amounts of catalyst master batch (i) used are generally 0.25-10 parts by weight based upon 100 parts by weight of PET polyester (a), preferably around 0.5-2 parts by weight to give good dispersion and mixing properties.

As reaction apparatuses for heating and melting, there can be used a single screw extruder, a twin screw extruder, a two-stage extruder (a combination of a single screw extruder and a twin screw extruder), a kneader-extruder, a self-cleaning type biaxial reaction apparatus to be used for condensation of PET polyester resins, and the like. A high temperature reaction method for manufacturing PET polyester resins of the present invention is performed particularly in an extruder within a short time of around 2-10 minutes. Therefore, L/D of twin screw extrusion reactors is preferably around 30-50, and more preferably around 38-45.

According to the present invention, molecular weights of polyester (a) generally increase rapidly for a short time, for example, 30 seconds to 20 minutes, preferably 1 minute to 10 minutes, and more preferably 1.5-5 minutes, resulting in PET polyesters of the present invention.

For the above reaction apparatuses, recovery PET bottle flakes or virgin polyester resins air-dried at 110-140° C. to give lower water content of 100-200 ppm, and those dried with dehumidified air to give lower water content of 50 ppm or less, are used preferably. Polyester resins generally absorb moisture in the air and have water content of 3,500-6,000 ppm (0.35-0.60% by weight) depending upon environmental humidity. Therefore, an object of the present invention can be always achieved by performing the above drying treatment(s).

On the other hand, even in cases of using non-dried recovery PET bottle flakes or non-dried virgin polyester resins as starting materials, the object of the present invention can be achieved by use of a twin screw extruder with vacuum lines of an oil-sealed type, preferably of a dry type, and with $13.3 \times 10^3$ Pa (100 mmHg) or less in the first-third vents, preferably $2.6 \times 10^3$ Pa (20 mmHg) or less, and more preferably $0.66 \times 10^3$ Pa (5 mmHg) or less; and removing moisture by vacuum-degassing during and immediately after melting polyester resins.

The method for moulding amorphous (A-PET) sheets and boards made of PET polyesters of the present invention can be carried as described in inventions of the prior art. When an extruder of a moulding apparatus is of a single-screw type, polyester pellets of the present invention may adhere to the screw groove. Thus, a lubricant such as calcium stearate may be mixed with these pellets in an amount of 0.01-1 part by weight based upon 100 parts by weight of these pellets. Furthermore, by setting the temperature of an extruder to around 260-290° C. and then cooling down, amorphous sheets and boards can be moulded. The temperatures of the touch roll and the chill roll are normally 10-90° C., preferably 30-60° C.

In order to manufacture sheets, boards, containers, and other mould articles for foods and beverages according to the present invention, PET polyester (a) is subjected to the manufacturing method of the present invention using a feed-block or manifold type of T dies and supplying additional virgin PET so as to mould sheets and boards of two kinds of two layers, two kinds of three layers, or two kinds of plural layers. Proviso that these layers made of recovery PET sheets and boards are used as inner layers so as not to contact directly with foods to be contained.

In cases of manufacturing transparent heat-resistant sheets and boards according to the method of the present invention, they are retained horizontal or vertical, and heated by hot-air of 120-200° C. or by two far IR heaters of around 200-500° C. for around 30-60 seconds to be transparent at 120-200° C., preferably 130-180° C. of surfaces of the sheets and the boards, following 10-90° C. of the cooling roll for 1-3 second(s). Under these conditions, i.e. a non-oriented crystallisation, spherical crystals smaller than wave lengths of visual lights are formed to give excellent crystals keeping tranparency.

In cases of manufacturing transparent heat-resistant mould articles according to the method of the present invention, sheets and boards are heated by two far IR heaters of around 200-500° C. for around 30-60 seconds to be transparent at 120-150° C., preferably 130-140° C. of their surfaces, and they are vacuum-, pressure-, or vacuum-pressure-formed following heat-setting by 10-90° C. of dies for 1-30 second(s), preferably 3-10 seconds. Under these conditions, i.e. an oriented crystallisation, spherical crystals smaller than wave lengths of visual lights are formed to give excellent crystals keeping tranparency.

In cases of manufacturing opaque heat-resistant mould articles according to the method of the present invention, sheets and boards are heated by two far IR heaters of around 200-500° C. for around 40-120 seconds to be white opaque at 155-250° C., preferably 160-185° C. of their surfaces, and they are vacuum-, pressure-, or vacuum-pressure-formed following heat-setting by 10-90° C. of dies for 1-30 second(s), preferably 3-10 seconds. Under these conditions, i.e. an oriented crystallisation, spherical crystals greater than wave lengths of visual lights are developed to give improved heat-resistance while giving opacity.

EXAMPLES

In Examples, the present invention will be described in detail.

Regarding polyesters, (1) intrinsic viscosity (IV), (2) melt flow rate (MFR), (3) swelling, (4) molecular weight, (5) mechanical property, (6) melt viscosity, (7) DSC, (8) crystallisation degree, (9) transparency, and (10) heat-resistance were evaluated. The evaluation methods are as follows.

(1) IV:

Using a 1:1 solvent mixture of 1,1,2,2-tetrachloroethane and phenol, and a Cannon-Fenske viscometer, IV values were measured at 25° C.

(2) MFR:

According to JIS K7210-20, MFR values were measured at a temperature of 280° C. and a load of 2.16 Kg.

(3) Swelling:

Using a melt indexer for MFR, samples were allowed to freely flow and run down at 280° C. and a load of 2.16 Kg. The samples were cut off when they had flowed down over 2.0 cm. The diameters of the samples were measured at their 5.0 mm point from their lowest end, and their swellings then were calculated by the following formula. Furthermore, the diameters were measured several times and their averages were obtained. The value "2.095" in the following formula is the diameter of the nozzle of the melt indexer.

Swelling (%)=[(average diameter−2.095)/2.095]×100

(4) Molecular Weight:

Molecular weights were measured using the GPC method under the following conditions:
SYSTEM-21, manufactured by Showa Denko K.K.
Column for samples: Shodex KF-606M;
Column for reference: Shodex KF-606M;
Eluant: hexafluoroisopropyl alcohol for both the samples and the reference;
Column temperature: 40° C.;
Injection volume: 20 µl per sample;
Flow rate: 0.6 ml/minute;
Polymer concentration: 0.15% by weight;
Detector: Shodex RI-74; and
Standard for molecular weight conversion: Shodex M-75 (PMMA).

(5) Mechanical Properties:

In a press-moulder, samples were preheated for 3 minutes at 280° C., pressed for 30 seconds under 60 atm, and shaped into press plates of around 1 mm in thickness and of around 3 mm in thickness under water-cooling. Tensile tests were performed according to JIS K7113, and the press plates around 1 mm thick were perforated with the No. 2 dumbbell. Using Autograph DSS2000, manufactured by Shimadzu Corporation, the tension speed was 200 mm/minute. Izod impact tests were performed according to JIS K7110 on the press plates of around 3 mm in thickness processed into No. 2 sample pieces with a notch.

(6) Melt Viscosity:

Using DynAlyser DAR-100, manufactured by REOLOGICA Co. Ltd., Sweden, melt viscosities were measured by applying torsional oscillation between the hot plates to test sample pieces of 2 square cm×2 mm in thickness at 280° C. under a nitrogen atmosphere.

(7) DSC and (8) Crystallisation Degree:

Using DSC 220, manufactured by Seiko Instruments Inc., DSC and crystallisation degrees were measured on 5-15 mg of samples under 50 ml/minute of nitrogen at 20-300° C. with a temperature-increasing rate of 10° C./minute.

$$\begin{aligned}\text{Crystallisation degree (\%)} &= ((\text{melting calorie per mole, } Hm) - \\ &\quad (\text{cooling-crystallisation calorie per mole, } Hc))/ \\ &\quad (\text{melting calorie per mole of complete} \\ &\quad \text{crystalline } PET, 26.9 \ KJ) \times 100 \\ &= (Hm \ (\text{J/g}) - HC \ (\text{J/g}))/1.40 \ (\%)\end{aligned}$$

(9) Transparency:

Transparency was measured according to JIS K7136. For sheets of around 0.2-2 mm in thickness and of 6 square cm, transparent (1-5% haze), translucent (5-10% haze), white and transparent (10-40% haze), and white and opaque (40% or more haze) references were prepared. Transparency of the mould articles was compared to that of the references and then evaluated.

(10) Heat-resistance:

Heat-resistance was measured according to JIS K7195. PET sheets and boards of around 3 mm or less thickness, 30 mm width, and 120 mm length were fixed at their one end, and then remained horizontal in a hot-air oven of 80° C. or higher. Over fixed time, that is around 1-10 minute(s), lengths of freely-flowing were recorded at the other end. If at 80° C. and 5 minutes these lengths were 50 mm or longer, the sheets and the boards were recognized to have no heat-resistance.

On the other hand, the mould articles were cut into 30 mm×30 mm, further punch-pored (3 mm), suspended by wire, and set in the hot-air oven. Over fixed time, that is around 1-10 minute(s), state-changes such as deformation, shrinkage, whitening, and crystallisation were recorded. If these state-changes were great, the moulds were recognized to be without heat-resistance.

Production Examples 1-5

Coupling Agent Master Batches (f1)-(f5):

Production Example 1 (f1)

Using a twin-screw extruder, manufactured by Berstorff Maschinenbau Gmbh, with an aperture of 43 mm in its diameter, L/D=43, and three-vented water shield type of vacuuming, 50 parts by weight of clear flakes, from Yono PET Bottle Recycle Co. Ltd., recycled from PET bottles, of 0.725 dl/g IV, of 56 g/10 minutes MFR, of 10% swelling, and of 99.9% PET content, were dried with hot-air for around 12 hours at 120° C.; and 50 parts by weight of dried pellets of PETG 6763, from Eastman Chemical Co. Ltd., of 0.73 IV, of 1.27 density, ethyleneglycol cyclohexanedimethanol terephthalic acid copolymer; were extruded at a preset temperature of 260° C., a screw-revolving speed of 200 rpm, around −600 mmHg in the first vent, around −670 mmHg in the third vent, and an automatic supply rate of 30 Kg/h, while 15 parts by weight of ethyleneglycol diglycidyl ether, a bifunctional epoxy compound (b), EPOLIGHT 40E from Kyoeisha Chemical Co. Ltd., a pale yellow liquid with an epoxy equivalent of 135 g/equiv as a coupling agent was injected using a metering pump through the aperture of the second vent.

Five strands out of die pores of 3.5 mm in diameter were cooled down with water, and the resulting strands were cut into pellets with a rotary cutter. The resulting colourless transparent pellets were air-dried at around 40° C. for around 30 minutes and then at 120° C. for around 1 hour, and reserved in a moisture-proof bag to yield around 100 Kg of coupling agent master batch (f1), in which (c)/(b)=0/100.

Production Example 2 (f2)

As well as in Production Example 1, proviso that 15 parts by weight of a mixture of 75 parts by weight of bifunctional ethyleneglycol diglycidyl ether (b) and 25 parts by weight of trifunctional trimethylolpropane triglycidyl ether (c) (EPO-LIGHT 100MF from Kyoeisha Chemical Co. Ltd., a pale yellow liquid with an epoxy equivalent of 150 g/equiv) was injected and mixed. The resulting strands were cut into pellets, dried, and then stored in a moisture proof bag, to thus yield around 100 Kg of coupling agent master batch (f2), in which (c)/(b)=25/75.

Production Example 3 (f3)

As well as in Production Example 1, proviso that 15 parts by weight of a mixture of 50 parts by weight of bifunctional ethyleneglycol diglycidyl ether (b) and 50 parts by weight of trifunctional trimethylolpropane triglycidyl ether (c) was injected and mixed. The resulting strands were cut into pellets, dried, and then stored in a moisture proof bag, to thus yield around 100 Kg of coupling agent master batch (f3), in which (c)/(b)=50/50.

Production Example 4 (f4)

As well as in Production Example 1, proviso that 15 parts by weight of a mixture of 25 parts by weight of bifunctional ethyleneglycol diglycidyl ether (b) and 75 parts by weight of trifunctional trimethylolpropane triglycidyl ether (c) was injected and mixed. The resulting strands were cut into pellets, dried, and then stored in a moisture proof bag, to thus yield around 100 Kg of coupling agent master batch (f4), in which (c)/(b)=75/25.

Production Example 5 (f5)

As well as in Production Example 1, proviso that 15 parts by weight of trifunctional trimethylolpropane triglycidyl ether (c) were injected and mixed. The resulting strands were cut into pellets, dried, and then stored in a moisture proof bag, to thus yield around 100 Kg of coupling agent master batch (f5), in which (c)/(b)=100/0.

Production Examples 6 and 7

Catalyst Master Batches (i1) and (i2)

Production Example 6 (i1)

Using a twin-screw extruder, manufactured by Berstorff, with an aperture of 43 mm in its diameter, L/D=43, and three-vented water shield type of vacuuming, 50 parts by weight of a dry clear flakes, from Yono PET Bottle Recycle Co. Ltd., recovered PET bottles, of 0.725 dl/g IV and of 56 g/10 minutes MFR; 50 parts by weight of a dry PET-G 6763, from Eastman Chemical Co. Ltd., of 0.73 IV and of 1.27 density; and totally 10 parts by weight of a triplex catalyst made from 2.5 parts by weight of lithium stearate, 2.5 parts by weight of sodium stearate, and 5.0 parts by weight of calcium stearate, i.e. Li/Na/Ca=25/25/50; were mixed in a tumbler. While being extruded at a preset temperature of 260° C., a screw-revolving speed of 200 rpm, around −630 mmHg in the first vent, around −730 mmHg in the third vent, and an automatic supply rate of 30 Kg/h, five strands flowing out of a die pore of 3.5 mm were cooled with water and then cut into pellets by a rotation cutter. Around 10 Kg each of the resulting pellets was air-dried at 40° C. for around 1 hour and then at 120° C. for around 12 hours to yield catalyst master batches (i1) as a pellet, following storage in a moisture-proof bag.

Production Example 7 (i2)

A triplex catalyst from 25 parts by weight of lithium stearate, 25 parts by weight of sodium stearate, and 50 parts by weight of calcium stearate were mixed in a tumbler as a powder master batch catalyst (i2), following storage in a moisture-proof bag.

Examples 1-4

Pellets P1-4 and Boards B1-4 with Different (c)/(b) Ratios

Example 1

From P1 to B1

100 parts by weight of moist A-PET sheet flakes, recovered skeletons, of 0.71 dl/g IV, and of 60 g/10 minutes MFR; 1.0 part by weight of catalyst master batch (i1) from Production Example 6, Li/Na/Ca=25/25/50; and 4.5 parts by weight of coupling agent master batch (f1) from Production Example 1, (c)/(b)=0/100; were mixed in a tumbler. A twin-screw extruder PCM-70, manufactured by Ikegai Co. Ltd., with an aperture of 70 mm in its diameter, L/D=37, and three-vent oil-sealed-type vacuuming, was used. While being extruded at a preset temperature of 280° C., a screw-revolving speed of 100 rpm, around −735 mmHg in the first vent, around −750 mmHg in the second and third vents, and an automatic supply rate of 50 Kg/h, 10 strands flowing out of a die pore of 2 mm were cooled with water and cut into pellets by a rotation cutter. Around 50 Kg of the resulting pellets P1 were air-dried at 140° C. for around 4.5 hours and then stored in a moisture-proof bag. The MFR of the resulting P1 was 20 g/10 minutes.

To 100 parts by weight of P1 was added 0.2 part by weight of calcium stearate, and the resulting mixture was well-stirred in a tumbler. From the well-stirred mixture, using a single-screw extruder GS-65, manufactured by Ikegai Co. Ltd., with an aperture of 65 mm in its diameter, a horizontal extruding T die of 250 mm width, a 2 mm lip gap, and three-staged vertical polishing roll, boards were moulded. At a preset temperature of 280° C., a screw-revolving speed of 60 rpm, an automatic supply rate of 30 Kg/h, and a roll temperature of 30-50° C., transparent board B1, in which (c)/(b)=0/100, was obtained with 220 mm width, 1.5 m length and around 1 mm thickness.

Examples 2-4

From P2-4 to B2-4, respectively

By using the same procedure of Example 1, pellets and boards having different (c)/(b) ratios were manufactured.

4.0 parts by weight of (f2), 7.0 parts by weight of (f3), and 7.0 parts by weight of (f4) were mixed in a tumbler, respectively. After reactive extrusion, around 60 Kg each of pellets P2, P3 and P4 was obtained, whose MFR's were 18 g/10 minutes, 5.9 g/10 minutes, and 2.1 g/10 minutes, respectively.

Using these three pellets P2-P4, as well as described in Example 1, transparent boards were obtained with around 220 mm width, 1.5 m length and 1-1.5 mm thickness. The resulting boards from P2-P4 were B2-B4, respectively. Only regarding B4, crystallisaition early occured and then gave pale haze.

The results of DSC are shown in Table 1 where temperature-increasing or decreasing rate was 10° C./minute under nitrogen. As seen from Table 1, regarding B1-B4, crystallisation degrees were doubled by increasing (c)/(b) ratio. Furthermore according to other DSC results, isotherm crystallisation time at 170° C., which was the average temperature of resin moulding temperature and chill rolling temperature, was around 30 seconds for B3, which was transparent and of 1.2 mm thickness, while was several minutes for a commercially available A-PET board, which is Comparative Example 1 and of 1 mm thickness, and for a commercially available PET resin.

Examples 5-7

Example 5 (S5)

100 parts by weight of clear flakes, from Yono PET Bottle Recycle Co. Ltd., recovered PET bottles, of 0.725 dl/g IV, of 56 g/10 minutes MFR, of −10% swelling, and of 99.9% PET content; 3.5 parts by weight of coupling agent master batch (f2); 0.20 part by weight of powdered catalyst master batch (i2); and 0.05 part by weight of liquid paraffin; were mixed in a tumbler for 5 minutes. The resulting flake mixture was reactive-processed using a same direction twin-screw extruder, manufactured by Hitachi Zosen Co. Ltd., with screws whose diameters are 80 mm, L/D=36, and two-vent type, at a preset temperature of the screw and the T die of 265-280° C., a screw-revolving speed of 100 rpm, and an automatic supply rate of 150 Kg/h. Around 300 m of transparent sheet S5, which had 0.40 mm thickness, 910 mm width, high molecular weight and high melt tension, were manufactured through a T die of 1,400 mm width and of 280° C. and through a cooling roll of 30-60° C.

Example 6 (S6)

As well as in Example 5, except that 3.5 parts by weight of coupling agent master batch (f3) were used. Around 300 m of transparent sheet S6, which had 0.40 mm thickness, 910 mm width, high molecular weight and high melt tension, were manufactured.

Example 7 (S7)

As well as in Example 5, except that 3.5 parts by weight of a mixture of 1.75 parts by weight of coupling agent master batch (f2) and 1.75 parts by weight of coupling agent master batch (f3) were used, i.e. (c)/(b)=37.5/62.5. Around 300 meters of transparent sheet S7, which had only 0.22 mm thickness, 910 mm width, high molecular weight and high melt tension, were manufactured.

Heat-setting Tests by Hot-plate Processing of Sheets:

Totally three types of sheets, all of which were of 0.4 mm thickness, i.e. two different types of sheets S5 and S6 of the present invention, and a commercially available A-PET sheet (Comparative Example 2), were tested such that each sheet piece of 3 cm×12 cm in dimensions was inserted between two thick aluminium plates (their upper part was 5 mm thick, and their lower part was 10 mm thick) heated at a predetermined temperature by a hot-air circulation type electric furnace. After a heat-setting process for predetermined 1-40 second(s) was performed, the pieces were removed and rapidly cooled with a copper plate of 2 mm thickness. The tests were carried out at 150° C., 165° C., and 180° C. near to thermoforming conditions.

Figure 2:
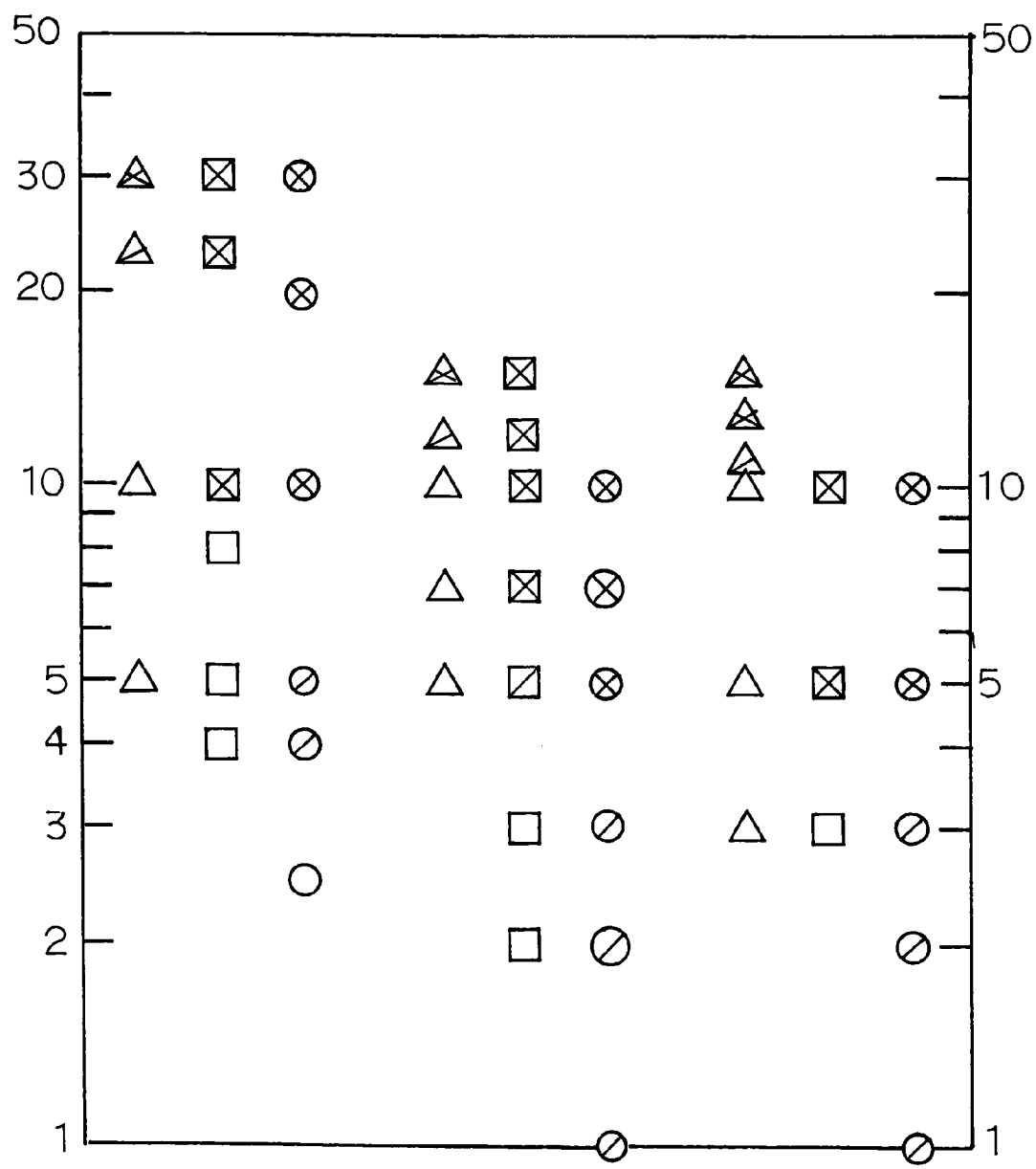
FIG. 2 shows measurement of crystallisation rate of PET sheets by the hot AL board method, and shows difference in crystallisation rates between a representative sheet made of PET polyesters of the present inventions and a commercially available amorphous (A-PET) sheet, as results of a hot plate fixing method.

Changes from transparent (outlined marks) to white crystallised (opaque, cross marks) through translucent (sash marks) by promoting crystallisation are shown in FIG. 2. With further respect to the marks in FIG. 2, square marks for sheet S5 where (c)/(b) ratio=25/75 comprising moderately branched long chain structures, triangle marks for the commercially available A-PET sheet consisting of linear structures, and circle marks for sheet S6 where (c)/(b) ratio=50/50 comprising highly branched long chain structures.

While the commercially available A-PET sheet, which is white and is a linear structure resin, crystallised slowly and required around 15 seconds or more at any temperature. Sheets S5 and S6 of the present invention (branched long chain structure resins) fast crystallised to be translucent within around 1-5 second(s), to be white and opaque within around 5-7 seconds, and faster crystallised at higher temperatures. These sheets of the present invention had a lot of trifunctional coupling agents resulting in so rapid white-crystallisation.

Regarding these three types of sheets untreated or treated by heat-setting at 150° C. for 10 seconds and at 180° C. for 5 seconds, the results of DSC are shown in Table 2. The untreated sheets of the present invention had a crystallisation degree of around 6% similar to that of the commercially available A-PET, i.e. 4.1%. After heat setting, however, the sheets of the present invention showed crystallisation degrees of around 12%, which was around twice as much as those before heat setting.

It has been revealed that in such a non-oriented crystallisation by the above hot-plate heat-setting method according to the present invention, crystallisation rates can be increased and controlled by the temperature and contact time at the heat-setting treatment.

Examples 8-10

From Sheets S5-7 to Lunch Boxes

Sheets S5 and S6 of 0.4 mm thickness were cut into pieces of 40 cm×40 cm. From these pieces, lunch boxes were thermoformed using FKC vacuum-pressure-forming machine, manufactured by Asano Laboratories Co., Ltd., with a female mould with heating by a heater. These lunch boxes had one large triangle sector, two small triangle sectors, 40 mm depth, and outer dimensions of 220×272 mm. By rapid heating, the surface temperature of the sheets is 170-250° C. to give a white crystallised state. Pressure-forming was performed with the female mould and the plug of around 70° C., 2-7.5 atm, and 10 seconds/shot. When the sheet surface temperature was around 230° C., excellent white moulds with gloss and flexibility were obtaind (Examples 8 and 9). Sheet S6 in which (c)/(b)=50/50 showed less drawn-down, faster crystallisation, and better at mouldability than S5. Into the resulting lunch boxes was poured vegetable oil of 180-220° C. resulting in no deformation of the lunch boxes and in sufficient heat-resistance of the lunch boxes.

On the other hand, for S7 of 0.22 mm thickness and of (c)/(b)=37.5/62.5, the sheet surface temperature was 190-250° C. to be crystallised to be white. Furthermore, the temperatures of the female mould and the plug were 80° C. Still furthermore, under 2-5 atm and with 10 seconds/shot. A translucent lunch box (Example 10) could be obtained.

Comparative Example 2

A commercially available A-PET sheet of 0.4 mm thickness could not be thermoformed especially as a white mould due to its great drawn-down when the sheet surface temperature was equal to or higher than 180° C.

The results of DSC of the around twice biaxially oriented bottoms and side walls of these three lunch boxes of the present invention are shown in Table 3. The crystallisation degrees of lunch boxes from Sheet S6 of 0.4 mm thickness were 21% on the bottom and 25% on the side wall. The crystallisation degrees of lunch boxes from Sheet S7 of 0.22 mm thickness were 11% on the bottom and 13% on the side wall. Sheet S6 having higher contents of trifunctional epoxides showed twice crystallisation degrees of those of S7 resulting in improved heat-resistance.

Furthermore, white containers of the present invention have long chain branched structures. Their entanglement effects give an advantage that resulting mould articles are not brittle and do not have weakness due to progress of recrystallisation, even under a high temperature.

Examples 11 and 12

From Transparent Boards B11 and B12

100 parts by weight of recovery moist flakes, from Yono PET bottle Co. Ltd., of 0.73 dl/g IV; 2.0 parts by weight of coupling agent master batch (i 2) with (c)/(b) ratio=25/75; 0.20 part by weight of catalyst master batch (i2); and 0.02 part by weight of liquid paraffin; were mixed in a tumbler for 5 minutes. The resulting flake mixture was reactive-processed, using a two-vent type of a same-direction twin-screw extruder, manufactured by Hitachi Zosen Co. Ltd., with an 80 mm screw diameter and with L/D=36, at a preset temperature of the screw and the die of 270° C., a screw-revolving speed of 100 rpm, and a supply rate of 250 Kg/h. Subsequently, by extrusion through the T die of 1,400 mm width at 280° C. and by a cooling roller, transparent board B11 where (c)/(b) ratio=25/75 of 2.0 mm thickness, 910 mm width, 1,800 mm longth, a high molecular weight, and a high melt tension, was produced (Example 11).

Similar to in Example 11, transparent board B12 where (c)/(b) ratio=50/50 of 1,800 mm length, 2.0 mm thickness, 910 mm width, a high molecular weight, and a high melt tension, was produced, proviso that 1.5 part by weight of coupling agent master batch (f3) with (c)/(b) ratio=50/50 was used (Example 12).

Examples of Pressure-forming from Boards B11 and B12 to Transparent Heat-resistant Cups C11 and C12, Respectively.

Transparent boards B11 and B12 of 2 mm thickness of the present invention were cut into 40 cm×40 cm pieces, which were thermoformed into deep cups of 64 mm of open diameter, of 50 mm of their bottom diameter, and of 109 mm depth, using a vacuum-pressure-forming machine manufactured by Asano Laboratories Co., Ltd. By rapid heating, these boards were allowed to have a temperature of 120-160° C. at their surfaces to be transparent. These boards were pressure-formed with 20-90° C. of the female mould and the plug, 2-10 atm, and 3-30 seconds/shot of closing time. For example, in a case of 400-450° C. of a heater temperature, 75° C. of a mould temperature, and 20 seconds of pressure-forming time, transparency of the resulting moulds, which is depend upon heating-time and surface temperature, changed from haze 1 (55 seconds, 128° C., transparent) via haze 4 (63 seconds, 130° C., transparent) and via haze 10 (61 seconds, 132° C., transparent with slightly white) to haze 20 (57 seconds, 140° C., slightly white). Naturally, these whitening conditions gave transparency when heating time was reduced.

From B11 and B12, transparent excellent cups C11 (Example 11) and C12 (Example 12) were obtained, respectively. Cup C12 with a higher (c)/(b) ratio was superior to C11 in mouldability. Especially when the board surfaces were 128-134° C., transparent (haze 1-5) mould articles were obtained and showed heat-resistance against pouring of boiling water.

DSC at 3 cm from the bottom of transparent cup C12 where 0.2 mm thick and around 5 folds stretched is shown in Table 3. Crystallisation degree of this transparent cup, subjected to 3 seconds/shot of closing time, was high (33%) and similar to 36% in a case of a commercially available biaxially oriented film. This showed that thermoforming could be performed rapidly. Test sample pieces of C12 did not become white nor brittle even in a hot-air oven of 120-180° C., and thus showed transparency and heat-resistance.

Examples 13 and 14

As well as in Examples 11 and 12, using B11 and B12, proviso that they were 150-170° C. at their surface to be white and were pressure-formed, white opaque highly-heat-resistant cups C13 and C14 were manufactured, respectively. White cup C13 was excellent, white and flexible (haze 40) especially in the case of 164° C. of the surface temperature.

White cup C14 was translucent (haze 10) in the case of 153° C. of the surface temperature. In the case of 180° C. of the surface temperature, the bottom of C14 was broken down. On the other hand, for example, in a case of 600° C. of a heater temperature, 75° C. of a mould temperature, and 3-5 seconds of pressure-forming time, the resulting white cups, which were obtained depending upon heating-time and surface temperature, changed into white opaque excellent cups in a case of 20-40 seconds and 161-164° C. These white opaque excellent cups showed heat-resistance against high temperatures such as 235° C. of poured vegetable oil.

DSC at 3 cm from the bottom, around 5 folds stretched, of white cup C14, subjected to 3 seconds/shot of closing time, is shown in Table 3. According to other DCS data, cups similar to white cup C14 showed constant crystallisation degree of 26% even if closing time was varied to be 3, 5, 15, or 30 seconds/shot. Thus, B12 of the present invention gave extremely good processability for pressure-forming.

However, a commercially available A-PET board (K-APET-BR), 2 mm, transparent, and from recovered PET bottles by Kasai Industry Co. Ltd., showed a slight drawn-down in a case of 162° C. of the board surface temperature. Even if the closing time was 30 seconds/shot, only translucent (haze 10) cups were obtained (Comparative Example 4).

Examples 15 and 16

From Transparent Boards B11 and B12 to Transparent Heat-resistant Boards H15 and H16

Transparent (haze 2-4) boards B11 and B12 in which (c)/(b)=25/75 and 50/50, respectively, were cut into pieces of 3 cm in width×12 cm in length. These pieces were hung vertically in Mini Jet Oven, a hot-air oven manufactured by Toyama Industries Co. Ltd. Heat-settings were performed at around 150-210° C. for 40-120 seconds. The resulting pieces removed from the oven, i.e. transparent heat-resistant boards H15 and H16 then immediately were cooled by two cooper plates of 2 mm thickness.

For these transparent heat-resistant boards H15 and H16 of the present invention, heat-resistance was measured accoring to JIS Method K7195. These boards of around 2 mm thickness, 30 mm width, and 120 mm length were fixed at their one end and retained horizontal in a hot-air oven of 80° C. or higher. Over around 1-10 minutes, lengths of drawn-down were measured and recorded at the other end. If these length were 50 mm or longer at 80° C. after 5 minutes, these boards were defined to have no heat-resistance.

The results of evaluation of heat-resistance of these boards are shown in Table 4 including also a commercially available A-PET transparent board (Comparative Example 4).

The optimum condition in the hot-air treatment on 2 mm boards of the present invention was 180-195° C. and 50-60 seconds. 150° C., which is higher than crystallisation temperatures (Tc) of 120-135° C., and 60 seconds did not give heat-resistance, while 210° C. and 40 seconds tended to give drawn-downs and could not give heat-resistance. 50 seconds or less of heating time did not give sufficient crystallisation, while 60 seconds or more of heating time generated whitening and brittleness due to too much crystallisation.

Example 17

To Transparent Heat-resistant Board H17 Using a Far-infrared (IR) Heater

The FKC vacuum-pressure-forming machine used also in Example 8, and 40 cm×40 cm pieces of transparent board B12 of 2 mm thickness of the present invention were used. By rapid heating with a far IR heater of 400° C., these pieces were heated for 40 seconds to be 128° C. at the surfaces and to be transparent, following cooling with compressed air, and finally resulting in transparent excellent boards with gloss and flexibility. The results of the tests on these boards at around 80° C. are shown in Table 4. Heat-resistance was expressed, however, slightly not sufficient.

In the case of heating for 50 seconds and 130° C. at the surfaces, however, heat-resistance of the board was improved enough (Table 4).

Example 18

Moulding From Sheet S18 into Blister Packs

According to Examples 5 and 6, S18 was manufactured. 100 parts by weight of clear flakes, from Yono PET Bottle Recycle Co. Ltd., recovered PET bottles; 1.5 parts by weight of coupling agent master batch (f3); 0.20 part by weight of powdered catalyst master batch (i2); and 0.05 part by weight of liquid paraffin; were mixed in a tumbler for 5 minutes. The resulting flake mixture was reactive-processed using a same direction twin-screw extruder, manufactured by Hitachi Zosen Co. Ltd., with a screw whose diameter is 80 mm, L/D=36, and two-vent type. Around 300 m of transparent sheet S5, which had 0.50 mm thickness, 910 mm width, high molecular weight and high melt tension, were manufactured.

Sheet S 18, where (c)/(b)=50/50, of 0.5 mm thickness of the present invention was cut into 40 cm×40 cm pieces, which were vacuum-pressure-formed into blister packs of a helmet type, 150 width, 240 length, and 70 mm height, for containers, using the FKC vacuum-pressure-forming machine, manufactured by Asano Laboratories Co., Ltd.

By rapid heating, the surface temperature was set to be 140° C. The female mould temperature was set to be around 75° C. Other conditions were 3 atm of pressure and 10 seconds/shot of closing time. Relationship amongst the temperature of the above and below heaters, heating time, and transparency of these resulting blister packs was:

200/250° C., 180 seconds, and white (haze 30);
210/260° C., 134 seconds, and slightly white (haze 10);
220/270° C., 101 seconds, and transparent (haze 4);
250/300° C., 57 seconds, and transparent (haze 4);
270/320° C., 47 seconds, and transparent (haze 2); and
300/350° C., 36 seconds, and transparent (haze 2).

Under the condition of 140° C. of the surface temperature, around 75° C. of the mould temperature, 3 atm of pressure, and 10 seconds/shot of closing time, 210/260° C., 91 seconds, and slightly white (haze 10).

The optimum condition for moulding blister packs was chosen and was:
140° C. of the surface temperature;
around 75° C. of the female mould temperature;
3 atm of pressure;
10 seconds/shot of closing time;
300/350° C. of the above and below heaters; and
36 seconds of heating time.

In a hot-air oven of 80° C., state changes in such as deformation, shrinkage, whitening and crystallisation of the blister packs thus obtained were recorded. However, no changes were recorded and heat-resistance was observed. Even when tops and sides of the blister packs were cut off into 30 mm×30 mm pieces, which were punched resulting in 3 mm pores, and then hung by wire in the hot oven of 80° C., no great changes were observed.

Example 19

Continuous Production of Transparent Board/biaxially Oriented Film Laminates:

Likely Example 11, 100 parts by weight of recovery moist flakes, from Yono PET bottle Co. Ltd., and of 0.73 dl/g IV; 1.5 parts by weight of coupling agent master batch (f3) with (c)/(b) ratio=50/50; 0.20 parts by weight of catalyst master batch (i2); and 0.02 parts by weight of liquid paraffin; were mixed in a tumbler for 5 minutes. The resulting flake mixture was reactively processed, using a two-vent type of a same-direction twin-screw extruder, manufactured by Hitachi Zosen Co. Ltd., with 80 mm screw diameter and with LJD=36, at a preset temperature of the screw and the die of 270° C., a screw-revolving speed 100 rpm, and a supply rate of 250 Kg/h. Subsequently, by extrusion through the T die of 1,400 mm width at 280° C., and by the first chill roll of 50° C., the second chill roll of 60° C. and the third chill roll of 80° C., transparent boards, where (c)/(b) ratio=50/50, of 2.0 mm thickness were produced. At the same time, a biaxially oriented film of 50 μm thickness from Toray Co. Ltd. was inserted between the transparent board and the first chill roll to produce transparent board/biaxially oriented film laminates.

Then the laminates were transported on Teflon-coated rollers of 1 inch diameter; passed through tunnels of 1,800 mm width, of 1 m length, and of 130° C., and then of 180° C., at a speed of 1 m/minute; and passed between two polishing rollers of 60° C. and 80° C., respectively. Finally, the resulting laminates were cut into those of 910 mm width and of 1,800 mm length, to continuously product transparent board/biaxially oriented film laminates B19 of 2 mm thickness and of (c)/(b)=50/50. In a case where a biaxially oriented film was pretreated with AC agents (polyester-polyurethanes/isocyanates) and with ozone (35 g/Nm$^3$, 3 Nm$^3$/h), the resulting adhesive strength between a board and a film was 140-230 g/15 mm width.

By a heat sag test at 80° C., transparent board/biaxially oriented film laminates B19 did not deform and showed excellent heat resistance. The thickness of the biaxially oriented film was not effective for heat resistance if below 10 μm, but gave pale white laminates if above 100 μm. Thus the thickness is preferably 15-80 μm, more preferably 30-60 μm.

TABLE 1

Results of DSC

| | from | to | (c)/(b) | Tg (°C.) | crystallisation temp. (°C.) | crystallisation calorie (J/g) | melting temp. (°C.) | melting calorie (J/g) | crystallisation degree (%) | recrystallisation temp. (°C.) | recrystallisation calorie (J/g) |
|---|---|---|---|---|---|---|---|---|---|---|---|
| Example 1 | P1 | B1 | 0/100 | 72 | 130 | −27 | 246 | 35 | 5.8 | 193 | −36 |
| Example 2 | P2 | B2 | 25/75 | 72 | 131 | −26 | 248 | 34 | 5.8 | 197 | −35 |
| Example 3 | P3 | B3 | 50/50 | 71 | 123 | −26 | 247 | 40 | 10.0 | 199 | −39 |
| Example 4 | P4 | B4 | 75/25 | 70 | 123 | −24 | 249 | 39 | 10.4 | 200 | −37 |
| Comparative example 1* | A-PET | | — | 74 | 133 | −28 | 251 | 36 | 6.0 | 198 | −40 |

*1 mm in thickness

TABLE 2

Results of DSC

| | sheets | Tg (°C.) | crystallisation temp. (°C.) | crystallisation calorie (J/g) | melting temp. (°C.) | melting calorie (J/g) | crystallisation degree (%) |
|---|---|---|---|---|---|---|---|
| Example 5 | S5 in which (c)/(b) = 25:75 | 69 | 126 | −26.7 | 251 | 35.2 | 6.1 |
| | 150° C. × 10 seconds | 73 | 123 | −13.2 | 251 | 33.7 | 14.6 |
| | 180° C. × 5 seconds | 72 | 121 | −20.5 | 251 | 33.7 | 9.4 |
| Example 6 | S6 in which (c)/(b) = 50:50 | 70 | 130 | −26.3 | 251 | 34.0 | 5.5 |
| | 150° C. × 10 seconds | 72 | 127 | −14.2 | 251 | 33.2 | 13.6 |
| | 180° C. × 5 seconds | 70 | 127 | −16.1 | 251 | 33.8 | 12.6 |
| Comparative example 2# | a commercially available A-PET | 71 | 128 | −27.8 | 249 | 33.6 | 4.1 |
| | 150° C. × 10 seconds | 73 | 123 | −25.2 | 249 | 34.0 | 6.3 |
| | 180° C. × 5 seconds | 72 | 122 | −24.9 | 250 | 33.6 | 6.2 |

0.4 mm in thickness

TABLE 3

Results of DSC

| | films, sheets, boards, and moulds | Tg (°C.) | crystallisation temp. (°C.) | crystallisation calorie (J/g) | melting temp. (°C.) | melting calorie (J/g) | crystallisation degree (%) |
|---|---|---|---|---|---|---|---|
| Example 5 | S5 in which (c)/(b) = 25:75 | 69 | 126 | −26.7 | 251 | 35.2 | 6.1 |
| Example 6 | S6 in which (c)/(b) = 50:50 | 70 | 123 | −26.3 | 251 | 34.0 | 5.5 |
| Example 8 | at the bottom of a mould from S6 | 65 | 113 | −7.4 | 250 | 37.3 | 21.4 |
| | at the side wall of a mould from S6 | 63 | — | — | 251 | 34.9 | 24.9 |
| Example 10 | at the bottom of a mould from S7 | 71 | 120 | −20.2 | 249 | 36.0 | 11.3 |
| | at the side wall of a mould from S7 | 72 | 120 | −17.8 | 249 | 36.0 | 13.0 |
| Example 12 | a transparent cup from B12 (5 sec) | — | — | — | 252 | 46.8 | 33.4 |
| Example 13 | a white cup from B12 (3 sec) | 71 | — | — | 252 | 35.9 | 25.6 |

TABLE 3-continued

Results of DSC

| films, sheets, boards, and moulds | | Tg (° C.) | crystallisation | | melting | | crystallisation degree (%) |
|---|---|---|---|---|---|---|---|
| | | | temp. (° C.) | calorie (J/g) | temp. (° C.) | calorie (J/g) | |
| Comparative example 2# | a commercially available A-PET sheet | 74 | 133 | −27.9 | 251 | 36.4 | 6.0 |
| Comparative example 3## | a commercially available film stretched by a twin-screw | — | — | — | 255 | 50.5 | 36.1 |

0.4 mm in thickness
0.1 mm in thickness

TABLE 4

| | boards | hot-air oven (° C.) | heating time (seconds) | boards | running down at 80° C. | | heat-resistance |
|---|---|---|---|---|---|---|---|
| | | | | | 5 minutes (mm) | 10 minutes (mm) | |
| Example 15 | B11 in which (c)/(b) = 25/75 | — | — | transparent | <−50 | <−50 | No |
| | | 150 | 60 | | <−50 | <−50 | No |
| | | 180 | 60 | | −13 | −13 | Yes |
| | | 195 | 40 | | −25 | −34 | No |
| | | 195 | 50 | | −0 | −25 | Yes |
| | | 195 | 60 | | −8 | −12 | Yes |
| | | 210 | 40 | | −49 | <−50 | No |
| Example 16 | B12 in which (c)/(b) = 50/50 | — | — | transparent | <−50 | <−50 | No |
| | | 150 | 60 | | <−50 | <−50 | No |
| | | 180 | 60 | | −10 | −21 | Yes |
| | | 195 | 50 | | −15 | −20 | Yes |
| | | 195 | 60 | | −8 | −9 | Yes |
| | | 210 | 40 | | −33 | −41 | No |
| Example 17 | B12 in which (c)/(b) = 50/50 | 128 | 40 | transparent | −23 | −42 | No |
| | | 130 | 50 | | −11 | −19 | Yes |
| Comparative example 4** | a commercially available A-PET | — | — | transparent | <−50 | <−50 | No |
| | | 195 | 50 | | −35 | −45 | No |
| | | 195 | 60 | | −20 | −25 | No |

**2 mm in thickness

The invention claimed is:

1. A method of manufacturing transparent heat-resistant mould articles made of PET polyesters, wherein a mixture comprising:
   (1) 100 parts by weight of PET polyester (a) whose melt flow rate (MFR, JIS method: 280° C., 2.16 Kg in load) is 45-130 g/10 minutes;
   (2) 1-10 part(s) by weight of coupling agent master batch (f) comprising:
      5.0-50 parts by weight of coupling agent (d) which is a mixture of:
         25-95% by weight of compounds (b) containing two epoxy groups; and
         75-5% by weight of compounds (c) containing three or more epoxy groups; and
      100 parts by weight of substrate (e); and
   (3) 0.05-2 parts by weight of coupling reaction catalyst (g) which is metal salts of carboxylic acids;
is melted at a temperature over the melting point, and then reacted homogeneously with degassing and dehydrating in vacuo ($13.3 \times 10^3$ Pa or less) in a reaction-extruder to obtain PET polyester whose MFR is 40 g/10 minutes or less, and the resulting PET polyester is moulded into a transparent amorphous sheet or board, which then is heated by rapid heating with a heater temperature of 200-500° C. to a surface temperature of 120-150° C. to become a transparent and crystallized sheet; then the sheet is vacuum-, pressure-, or vacuum-pressure-formed in a female mold with a closing time of 3-10 seconds/shot.

2. A method of manufacturing opaque heat-resistant mould articles made of PET polyesters, wherein a mixture comprising:
   (1) 100 parts by weight of PET polyester (a) whose melt flow rate (MFR, JIS method: 280° C., 2.16 Kg in load) is 45-130 g/10 minutes;
   (2) 1-10 part(s) by weight of coupling agent master batch (f) comprising:
      5.0-50 parts by weight of coupling agent (d) which is a mixture of:
         25-95% by weight of compounds (b) containing two epoxy groups; and
         75-5% by weight of compounds (c) containing three or more epoxy groups; and
      100 parts by weight of substrate (e); and
   (3) 0.05-2 parts by weight of coupling reaction catalyst (g) which is metal salts of carboxylic acids;
is melted at a temperature over the melting point and then reacted homogeneously with degassing and dehydrating in vacuo ($13.3 \times 10^3$ Pa or less) in a reaction-extruder to obtain PET polyester whose MFR is 40 g/10 minutes or less, and the resulting PET polyester is moulded into a transparent amorphous sheet or board, which then is heated by rapid heating with a heater temperature of 200-500° C. to a surface temperature of 155-250° C. to become a translucent and crystallized sheet; then the sheet is vacuum-, pressure-, or vacuum-pressure-formed in a female mold with a closing time of 3-10 seconds/shot.

3. A method according to claim 1 or 2, wherein the PET polyester (a) contains at least one or more selected from the group consisting of PET with intrinsic viscosity of 0.60-0.80 dl/g, aromatic PET polyester, and recycled molds of aromatic PET polyester.

4. A method according to claim 1 or 2, wherein the compounds (b) contain at least one or more selected from the group consisting of aliphatic ethyleneglycol diglycidyl ether, polyethyleneglycol diglycidyl ether, hexamethylene diglycidyl ether; cyclic aliphatic hydrogenated bisphenol A diglycidyl ether; and aromatic bisphenol A diglycidyl ether.

5. A method according to claim 1 or 2, wherein the compounds (c) contain at least one or more selected from the group consisting of aliphatic trimethylolpropane triglycidyl ether, glycerin triglycidyl ether, epoxidised soybean oil, epoxidised linseed oil; heterocyclic triglycidyl isocyanurate; and aromatic phenol novolac-type epoxy resins, cresol novolac-type epoxy resins, and bis-resorcinol tetraglycidyl ether.

6. A method according to claim 1 or 2, wherein the coupling reaction catalyst (g) is at least one or more selected from the group consisting of lithium salts, sodium salts, potassium salts, magnesium salts, calcium salts, zinc salts, and manganese salts of stearic acid or acetic acid.

* * * * *